US009305013B2

(12) United States Patent
Riemers

(10) Patent No.: US 9,305,013 B2
(45) Date of Patent: Apr. 5, 2016

(54) URI FILE SYSTEM

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 896 days.

(21) Appl. No.: 12/200,779

(22) Filed: Aug. 28, 2008

(65) Prior Publication Data

US 2010/0057671 A1 Mar. 4, 2010

(51) Int. Cl.
*G06F 17/30* (2006.01)
*G06F 15/16* (2006.01)

(52) U.S. Cl.
CPC ............................. *G06F 17/30197* (2013.01)

(58) Field of Classification Search
USPC .................................. 707/758, 705; 709/230
See application file for complete search history.

(56) References Cited

U.S. PATENT DOCUMENTS

| | | | |
|---|---|---|---|
| 6,535,867 B1 * | 3/2003 | Waters | |
| 6,629,127 B1 * | 9/2003 | Deen et al. | 709/203 |
| 6,654,794 B1 * | 11/2003 | French | 709/217 |
| 6,654,795 B1 * | 11/2003 | Coile | 709/219 |
| 6,842,770 B1 * | 1/2005 | Serlet et al. | 709/203 |
| 7,284,232 B1 * | 10/2007 | Bates et al. | 717/100 |
| 7,536,445 B2 * | 5/2009 | Kinoshita | 709/217 |
| 7,925,974 B1 * | 4/2011 | McConnell et al. | 715/256 |
| 8,099,758 B2 * | 1/2012 | Schaefer et al. | 726/1 |
| 8,139,563 B2 * | 3/2012 | Jackson et al. | 370/352 |
| 8,738,725 B2 * | 5/2014 | McEntee | 709/216 |
| 2002/0082837 A1 * | 6/2002 | Pitman et al. | 704/270.1 |
| 2003/0193961 A1 * | 10/2003 | Moore et al. | 370/401 |
| 2004/0086100 A1 * | 5/2004 | Moore et al. | 379/201.01 |
| 2004/0205149 A1 * | 10/2004 | Dillon et al. | 709/217 |
| 2005/0091222 A1 * | 4/2005 | Serlet et al. | 707/10 |
| 2005/0125372 A1 * | 6/2005 | Da Palma et al. | 707/1 |
| 2006/0007455 A1 * | 1/2006 | Bailey | 358/1.9 |
| 2006/0200570 A1 * | 9/2006 | Stirbu | G06F 17/30067 709/230 |
| 2007/0073894 A1 * | 3/2007 | Erickson et al. | 709/230 |
| 2007/0198733 A1 * | 8/2007 | Matsubara | 709/230 |
| 2008/0178162 A1 * | 7/2008 | Sanford et al. | 717/139 |
| 2009/0119268 A1 * | 5/2009 | Bandaru et al. | 707/3 |

OTHER PUBLICATIONS

Yann LeCun, Overview of the DjVu Document Compression Technology, AT&T Labs Research, Middletown, NJ, Apr. 2001 pp. 119-122 (4 pages).

* cited by examiner

*Primary Examiner* — Hung T Vy
(74) *Attorney, Agent, or Firm* — Lowenstein Sandler LLP

(57) ABSTRACT

An apparatus and a method for accessing data from a server. In one embodiment, data referred by a Universal Resource Identifier (URI) is mounted on a file system. The mounted data can then be operated on using the file system. To mount the data referred by the URI, a Uniform Resource Locator (URL) fragment of the URI is determined. An identifier on the file system is generated based on the URL fragment. Data referred by the URI is mapped to the file system using the identifier.

18 Claims, 5 Drawing Sheets

URI FILE SYSTEM

TECHNICAL FIELD

Embodiments of the present invention relate to computing systems, and more particularly, to accessing data from a server.

BACKGROUND

There are many commands which need to access data relevant to Uniform Resource Identifiers (URI). Each one needs to interface with a library or command line utility. Some examples of individual file systems include ftpfs, httpfs, sshfs, and nfs. However none of these individual file systems generically handle URIs. Most individual file systems are limited. For example, httpfs can only be used to access a single URL on a http 1.1 server.

Often times these interfaces limit access to data. For example, if a script is using wget to access content on the web, there is no good way to seek through the data in real time.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for accessing data from a server. In one embodiment, data referred by a Universal Resource Identifier (URI) is mounted on a file system. The mounted data can then be operated on using the file system. To mount the data referred by the URL a Uniform Resource Locator (URL) fragment of the URI is determined. An identifier on the file system is generated based on the URL fragment. Data referred by the URI is mapped to the file system using the identifier.

Figure 1:
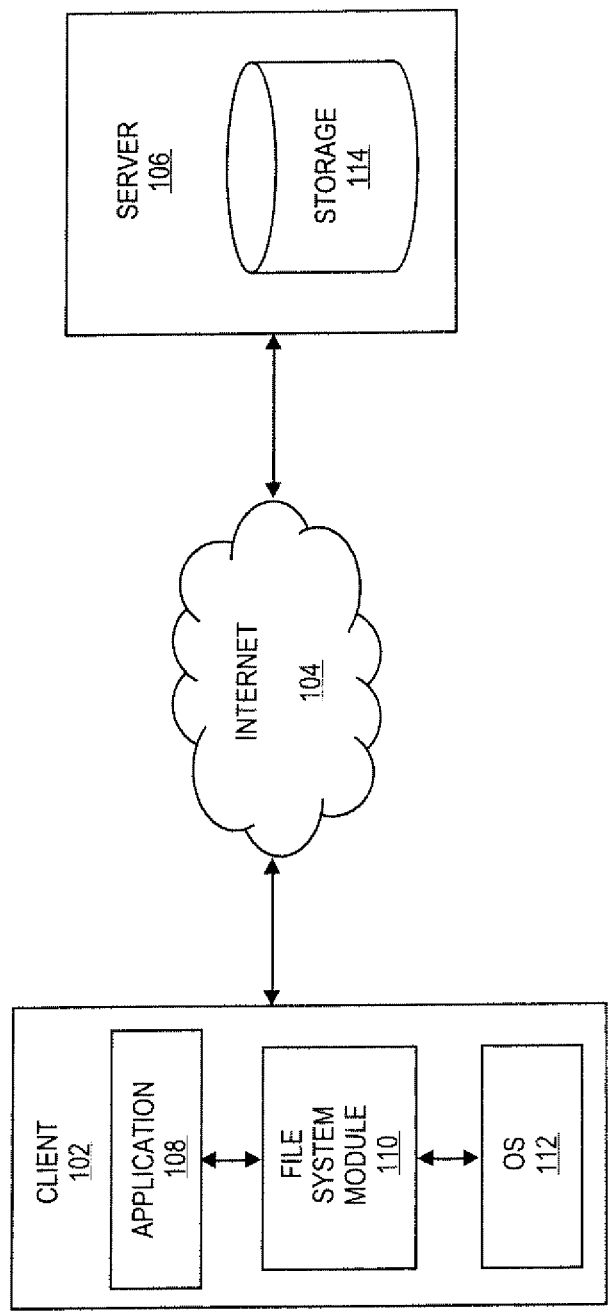
FIG. 1 is a block diagram illustrating one embodiment of a system for requesting data from a server.

FIG. 1 is a block diagram illustrating one embodiment of a system for accessing data from a server. A client 102 accesses data from storage 114 of server 106 via a computer network 104 such as the Internet. Data from server 106 may be referred by a Uniform Resource Identifier (URI) such as a Uniform Resource Locator (URL).

Client 102 includes an application 108, for example a web browser, configured to access the data from storage 114. Other types of applications may include media players. Data from storage 114 may be mounted on a file system on client 102 using a file system module 110. The file system module 110 operates in combination with the operating system 112 of client 102 to allow client 102 to access and manipulate the data in real-time from server 106 as if it was located on client 102. For example, client 102 can play a video from server 106 simply by opening the data on the mounted file system. There is no need to access any specific protocol to operate on the data.

The following is an example of mounting data from storage 114.
  mkdir/mnt/mywebsite
  urlmount http://docbiil.freeshell.org/mnt/mywebsite
  would make the data available in real time from "mywebsite". An example of an operation on data would look like this:
  gifview/mnt/mywebsite/images/foo.gif
  to access the contents. In one embodiment, the file system can be implemented directly into the kernel, as a loadable module, or in user space by means of a something like fuse.

Figure 2:
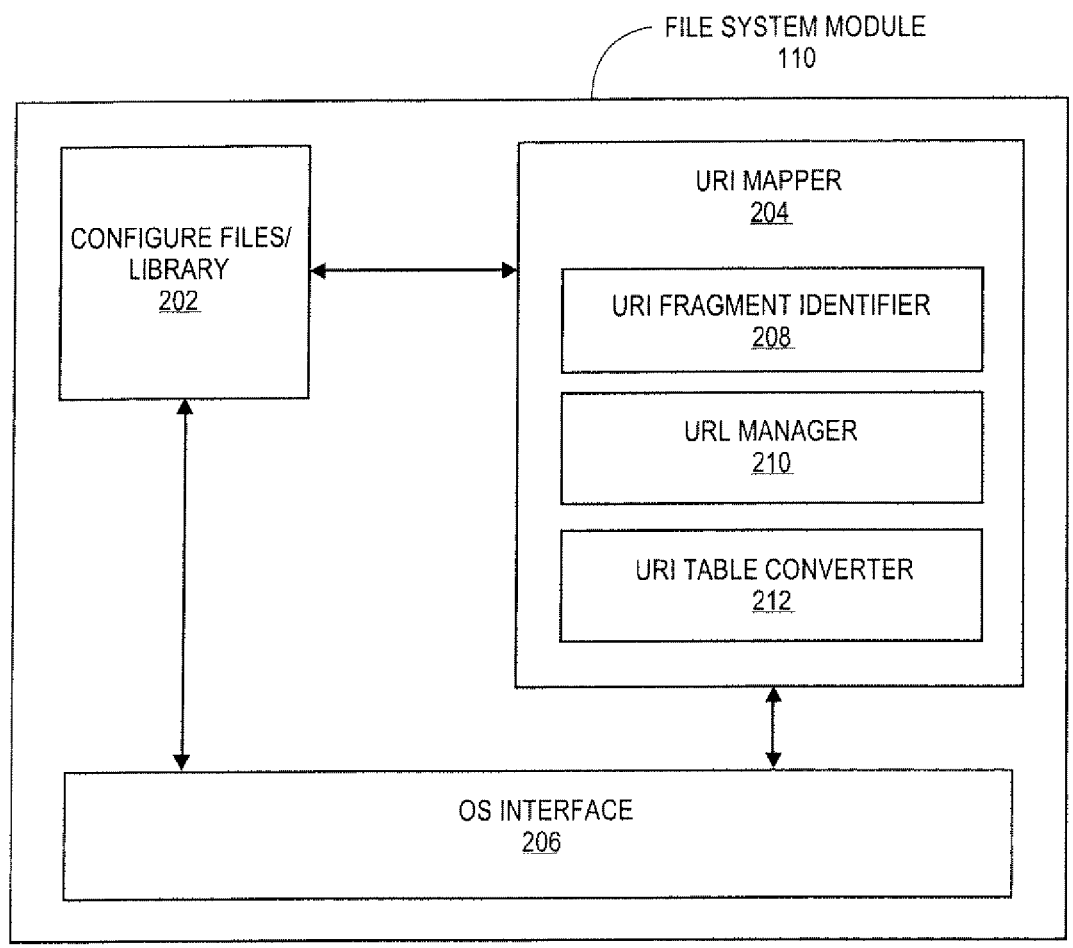
FIG. 2 is a block diagram illustrating one embodiment of a URI file system module.

FIG. 2 is a block diagram illustrating one embodiment of the file system module of FIG. 1. File system module 110 includes a library/configuration files 202, an operating system interface 206, a URI mapper 204.

In one embodiment, the file system can be built using what can be defined in configuration files 202, or addable as loadable modules/shared libraries 202. For example, in one implementation, library modules can be accessible via libvlc.so. This defines random access for a variety of schemes.

Operating system interface 206 interfaces the configuration library 202 and URI mapper 204 with the operating system 112 of client 102.

In one embodiment, URI mapper 204 maps URI to filenames. Each URI that should be accessible on the mounted file system needs to be mapped to an identifier on the file system. There are three ways to form the identifier: (1) use the URL fragment directly, (2) mangle the URL, or (3) convert the URL via table look up or algorithm to an identifier. As such, URI mapper 204 can include URI fragment identifier 208, URL mangier 210, and/or URI table converter 212.

URI fragment identifier 208 uses the URL fragment as the identifier on the file system. For example: urlmount ftp://docbill.freeshell.org/pub/linux/mnt/linux
  the URL ftp://docbill.freeshell.org/pub/linux/x86_64/Fedora-9/readme.txt could be mapped to /mnt/linux/x86_64/Fedora-9/readme.txt However, this type of rule may not work well for all types of URLs. For example: urlmount http://docbill.freeshell.org/mnt/mywebsite.

It is not clear if /mnt/mywebsite/resume refers to a directory on my website or a file.

URL mangier 210 mangles the URL referred by the URI. For example, if mapping the http://URL, anything with a # refers to a file and everything else refers to a directory. The correct way to refer to the web contents of http://docbill.freeshell.org/resume/ would be: /mnt/my website/resume/#
  Likewise http://docbill.freeshell.org/resume/index.html can be referenced as:
  /mnt/mywebsite/resume/index.html#
  In this scenario there would actually be two ways to refer to the resume:
  either: /mnt/mywebsite/resume/# or /mnt/mywebsite/resume#

It might be desirable to map one of these as symbolic link to indicate one of them is an automatic redirect.

A more sophisticated mapping is needed to map arbitrary URI's. For example consider: urlmount"/mnt/web Unless one wishes to modify the kernel and many libraries something like:
  /mnt/web/file://localhost/bin/ls is not going to work correctly. The reason being is the kernel or C library will probably convert the // into a single / in the request.

A more complicated mapping can be performed like converting // into /%/. So the file access for /bin/ls would be:
    /mnt/web/file:/%/localhost/bin/ls This works, only because in a well formed URI % is always followed by a two digit hex decimal number. So '/%/' is interpreted as simply meaning '//'.

URI Table Converter 212 converts the URI into an identifier via a table lookup or algorithm. For example, the filename may look like a hexdecimal representation of the URI fragment.

In an implementation, the above methods can be mixed and matched. For example, ftp URL's maps directly to the file system, while ISBN URN's might be mapped to keys from an LDAP server.

In one embodiment, the directory output depends on what type of directory structure to use. A wide range of options are available as to how to convert URI's to filenames on the filesystem. One option is not to have any visible directory structure. A simple way to do this is simply to deny permission to readdir(). For example:
    urlmount http://docbill.freeshell.org/mnt/mywebsite
    ls: reading directory test: Operation not permitted
    total 0 for an http mount, this might be the best option, since there is no http command, since http does not have a concept of a directory listing.

However, a listing may not want to be provided anyway. In that case some of the obvious choices are to show which URI's have been accessed recently, or perhaps the results of a webcrawl, or a listing obtained by other means.

The contents of the directory listings can be dependent on the URI to identifier, the scheme, meta data available, and what is determined to be important.

Figure 3:
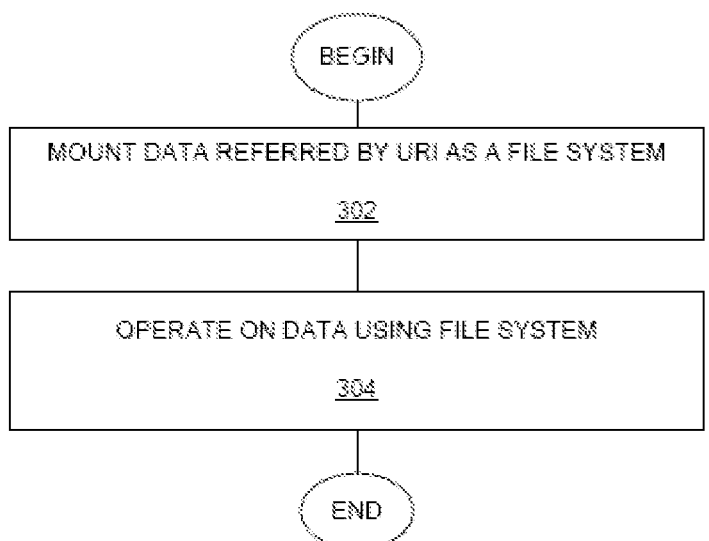
FIG. 3 is a flow diagram illustrating one embodiment of a method for accessing data using a URI file system.
Figure 4:
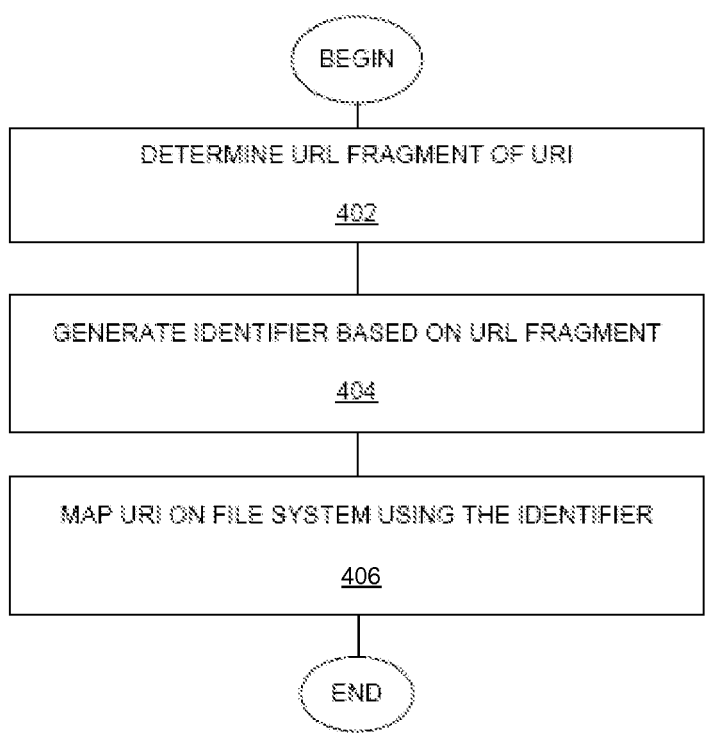
FIG. 4 is a flow diagram illustrating one embodiment of a method for mapping a URI to an identifier on a file system.
Figure 5:
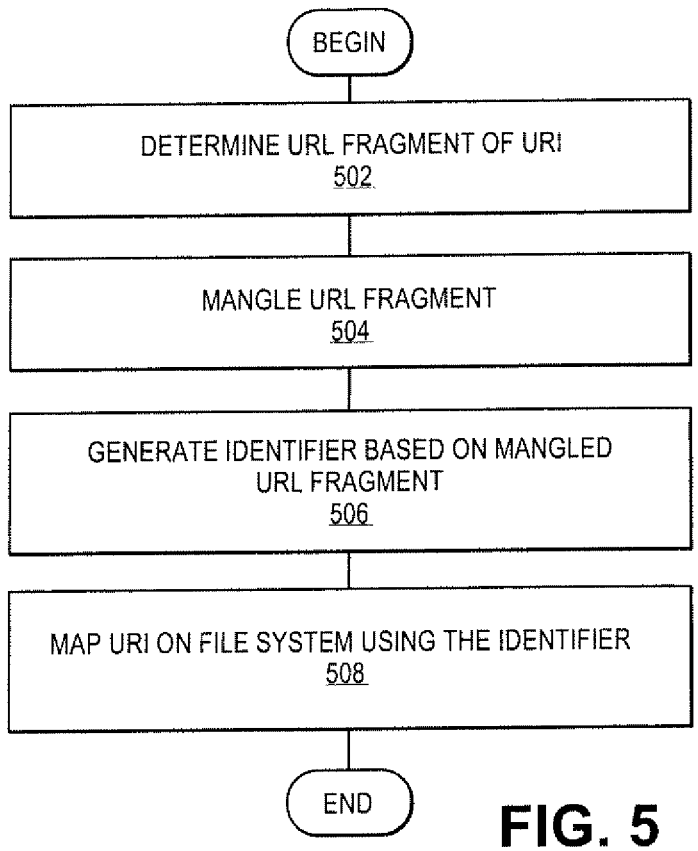
FIG. 5 is a flow diagram illustrating another embodiment of a method for mapping a URI to an identifier on a file system.
Figure 6:
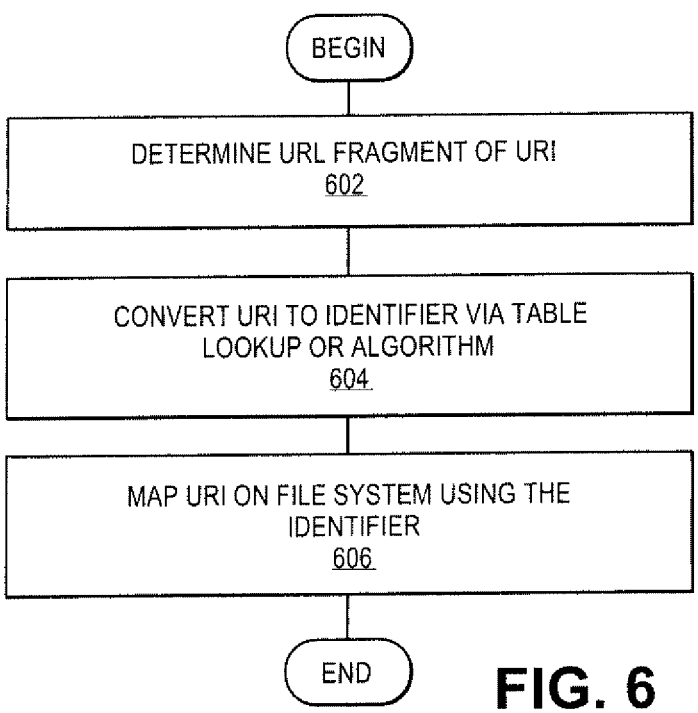
FIG. 6 is a flow diagram illustrating another embodiment of a method for mapping a URI to an identifier on a file system.

In one embodiment, the file content does not need to be represented as a regular file. For example, one might want to represent some URI's as named pipes, special devices, or even named sockets. It might even be desirable to make a single URI into multiple entries in a file system. For example, one might map http://docbill.freeshell.org/index.pl as regular file and a named socket. So programs which need to send POST arguments are able to, while programs which don't need to send POST arguments can access the URI as a normal file. Some obvious mappings:
    URI's which can not be randomly accessed (i.e. files on an http 1.0 server)-->named pipes, special device, or named socket
    URI's which can be randomly accessed (i.e. regular files on a http 1.1 server)-->regular file, named pipes, special device, or named socket
    URL's which are redirected-->symbolic links FIG. 3 is a flow diagram illustrating one embodiment of a method for mapping a URI to an identifier on a file system. At 302, data referred by a URI is mounted as a file system on a client. At 304, the client can operate on the data using the file system. The mapping can be performed in several ways. FIGS. 4, 5, and 6 illustrates different embodiments of the mapping.

FIG. 4 is a flow diagram illustrating one embodiment of a method for mapping a URI to an identifier on a file system. At 402, a URL fragment of the URI is determined. At 404, an identifier is generated based on the URL fragment. At 406, the URI is mapped on the file system using the identifier.

FIG. 5 is a flow diagram illustrating another embodiment of a method for mapping a URI to an identifier on a file system. At 502, the URL fragment of the URI is determined. At 504, the URL fragment is mangled. At 506, the identifier is generated based on the mangled URL fragment. At 508, the URI is mapped on the file system using the identifier.

FIG. 6 is a flow diagram illustrating another embodiment of a method for mapping a URI to an identifier on a file system. At 602, a URL fragment of the URI is determined. At 604, the URI is converted to an identifier using a table lookup or an algorithm as previously described. At 606, the URI is mapped to the file system using the identifier.

Figure 7:
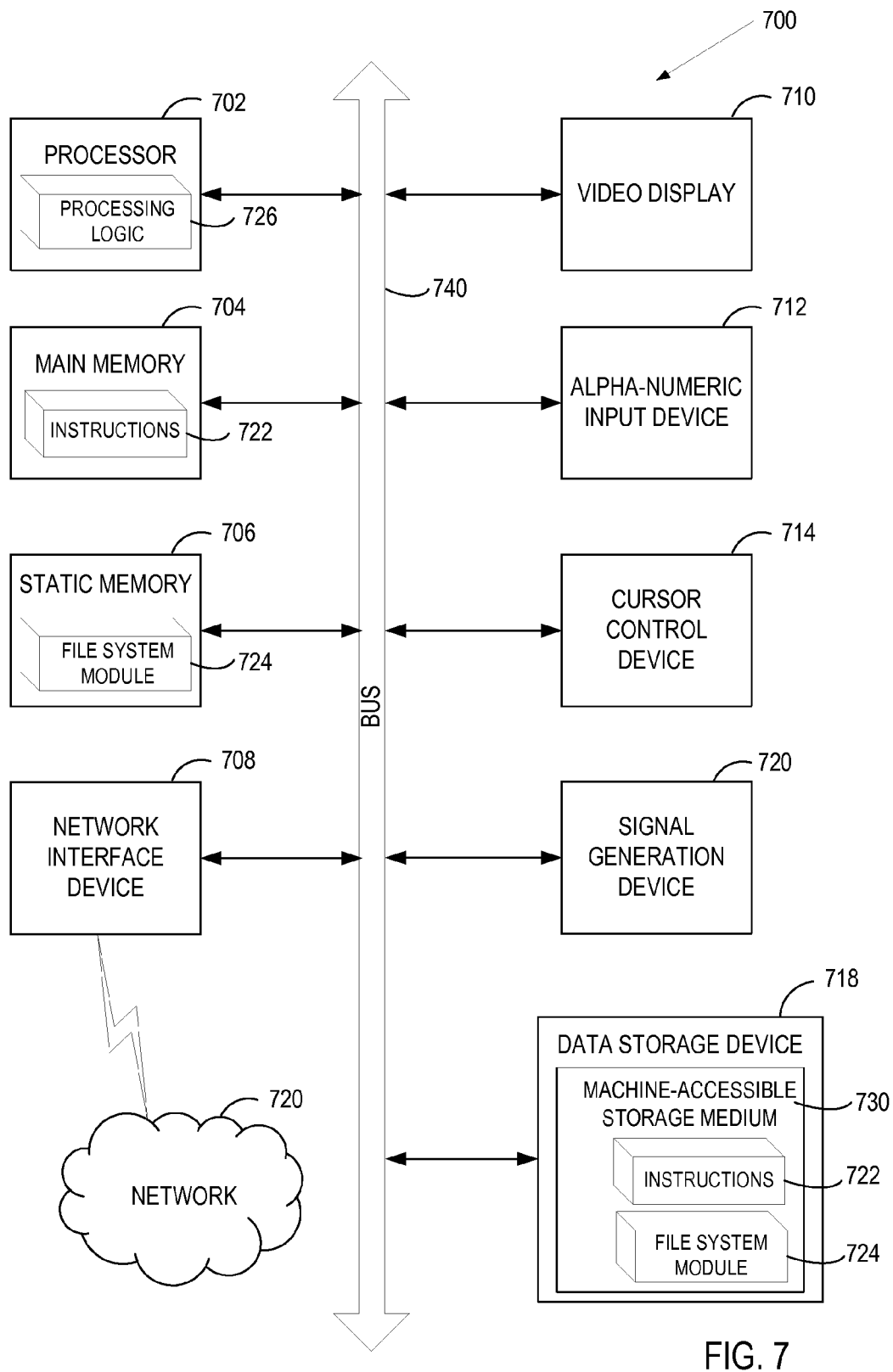
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 740.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store the file system module 724 as presently described. The file system module 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device, an instruction to mount a file system with data from a storage;
determining a plurality of Universal Resource Identifiers (URIs) to be accessible on the mounted file system in response to the instruction;
generating a plurality of identifiers corresponding to file names on the file system in view of locations of a plurality of data items referred by the plurality of URIs;
mounting, by the processing device, the file system with the plurality of data items referred by the plurality of URIs, wherein the mounting comprises mapping the plurality of data items referred by the plurality of URIs to the plurality of identifiers corresponding to file names on the file system; and
receiving an instruction to access at least one of the plurality of data items via the mounted file system.

2. The method of claim 1, wherein mapping the plurality of data items referred by the plurality of URIs comprises mangling at least one of the plurality of URIs and generating at least one of the plurality of identifiers in view of the mangled at least one of the plurality of URIs.

3. The method of claim 1, wherein mapping the plurality of data items referred by the plurality of URIs comprises converting at least one of the plurality of URIs into at least one of the plurality of identifiers of the file system using a table lookup.

4. The method of claim 1, wherein mapping the plurality of data items referred by the plurality of URIs comprises converting at least one of the plurality of URIs into at least one of the plurality of identifiers of the file system with a conversion algorithm.

5. The method of claim 1, wherein mapping the plurality of data items referred by the plurality of URIs comprises determining a fragment of at least one of the plurality of URIs and generating at least one of the plurality of identifiers by directly using the fragment.

6. The method of claim 1, wherein at least one of the plurality of identifiers has a name and represents a data item referred by the URI as one of a real file, a named pipe, a named socket or a symbolic link.

7. The method of claim 1, further comprising receiving a local directory location and wherein mapping the plurality of data items comprises mapping the plurality of data items referred by the plurality of URIs to a plurality of identifiers in the local directory location on the file system.

8. An apparatus comprising:
a memory; and
a processing device operatively coupled to the memory, wherein the processing device is to:
receive an instruction to mount a file system with data from a storage;
determine a plurality of Universal Resource Identifiers (URIs) to be accessible on the mounted file system in response to the instruction;
generate a plurality of identifiers corresponding to file names on the file system in view of locations of a plurality of data items referred by the plurality of URIs;
mount the file system with the plurality of data items referred by the plurality of URIs, wherein the mounting comprises mapping the plurality of data items referred by the plurality of URIs to the plurality of identifiers corresponding to file names on the file system; and
receive an instruction to access at least one of the plurality of data items via the file system.

9. The apparatus of claim 8, wherein the processing device is further to mangle at least one of the plurality of URIs and generate at least one of the plurality of identifiers in view of the mangled at least one of the plurality of URIs.

10. The apparatus of claim 8, wherein the processing device is to map the plurality of data items referred by the plurality of URIs by converting at least one of the one or more URIs into at least one of the plurality of identifiers on the file system using a table lookup.

11. The apparatus of claim 8, wherein the processing device is to map the plurality of data items referred by the plurality of URIs by converting at least one of the plurality of URIs into at least one of the plurality of identifiers with a conversion algorithm.

12. The apparatus of claim 8, wherein the processing device is to map the plurality of data items referred by the plurality of URIs by determining a fragment of at least one of the plurality of URIs and generating at least one of the plurality of identifiers by directly using the fragment.

13. The apparatus of claim 8, wherein at least one of the plurality of identifiers has a name and represents a data item referred by the URI as one of a real file, a named pipe, a named socket or a symbolic link.

14. A non-transitory computer-readable medium having instructions encoded thereon that, when executed by a processing device, cause the processing device to:
receive, by the processing device, an instruction to mount a file system with data from a storage;
determine a plurality of Universal Resource Identifiers (URIs) to be accessible on the mounted file system in response to the instruction;
generate a plurality of identifiers corresponding to file names on the file system in view of locations of a plurality of data items referred by the plurality of URIs;
mount, by the processing device, the file system with the plurality of data items referred by the plurality of URIs, wherein the mounting comprises mapping the plurality of data items referred by the plurality of URIs to the plurality of identifiers corresponding to file names on the file system; and
receive an instruction to access at least one of the plurality of data items via the mounted file system.

15. The non-transitory computer-readable medium of claim 14, wherein to map the plurality of data items referred by the plurality of URIs, the processing device is to mangle at least one of the plurality of URIs and generate at least one of the plurality of identifiers in view of the mangled at least one of the plurality of URIs.

16. The non-transitory computer-readable medium of claim 14, wherein to map the plurality of data items referred by the plurality of URIs, the processing device is to convert at least one of the plurality of URIs into at least one of the plurality of identifiers using a table lookup or a conversion algorithm.

17. The non-transitory computer-readable medium of claim 14, wherein to map the plurality of data items referred by the plurality of URIs, the processing device is to determine a fragment of at least one of the plurality of URIs and generate at least one of the plurality of identifiers on the file system by directly using the fragment.

18. The non-transitory computer-readable medium of claim 14, wherein at least one of the plurality of identifiers has a name and represents a data item referred by the URI as one of a real file, a named pipe, a named socket or a symbolic link.

* * * * *